United States Patent [19]

Bazzaz

[11] Patent Number: 5,469,214
[45] Date of Patent: Nov. 21, 1995

[54] DEVICE FOR RECURSIVE PROCESSING OF A VIDEO SIGNAL, COMPRISING A PLURALITY OF BRANCHES

[75] Inventor: Paul Bazzaz, Paris, France

[73] Assignee: U.S. Philips Corporation, New York, N.Y.

[21] Appl. No.: 168,730

[22] Filed: Dec. 16, 1993

[30] Foreign Application Priority Data

Dec. 22, 1992 [FR] France .................................. 92 15507

[51] Int. Cl.$^6$ .................................................. H04N 7/13
[52] U.S. Cl. ........................................ 348/416; 348/699
[58] Field of Search ..................................... 348/699, 716, 348/718, 719, 721, 415, 416, 413, 412, 402, 401, 409; H04N 7/13

[56] References Cited

U.S. PATENT DOCUMENTS

| | | | |
|---|---|---|---|
| 4,668,985 | 5/1987 | Kurashige et al. | 348/721 |
| 5,068,727 | 11/1991 | Haghiri et al. | 348/412 |
| 5,072,293 | 12/1991 | de Haan et al. | 348/699 |
| 5,130,797 | 7/1992 | Murakami et al. | 348/699 |
| 5,148,269 | 9/1992 | de Haan et al. | 348/699 |
| 5,170,259 | 12/1992 | Niihara | 348/415 |
| 5,200,820 | 4/1993 | Gharavi | 348/699 |
| 5,212,548 | 5/1993 | de Haan et al. | 348/416 |
| 5,327,232 | 7/1994 | Kim | 348/412 |

FOREIGN PATENT DOCUMENTS 0415491  3/1991  European Pat. Off. .

OTHER PUBLICATIONS

Research Disclosure, Sep. 1991, 643 32903.

*Primary Examiner*—Tommy P. Chin
*Assistant Examiner*—A. Au
*Attorney, Agent, or Firm*—Michael E. Marion

[57] ABSTRACT

Device for recursive processing of a video signal, comprising a plurality of n branches, for recursive parallel processing of a video signal, comprising at least a MEMORY BANK structure (1, 2, 3, 4) which includes: a demultiplexor for demultiplexing the video signal into a plurality of n temporally adjacent sections T1 ... Tn having a period of T; a decompressor for temporal decompression of each section T1 ... Tn for obtaining a spread of each decompressed section over a period of nT; a delayor for delaying each decompressed section by a time which is equal to the period T and for aligning each delayed decompressed section with the subsequent non-delayed decompressed section; each branch also comprising processing means (11–21–31; 12–22–32; 13–23–33; 14–24–34) operating in parallel and being coupled to the outputs of the MEMORY BANK structures for processing one of said temporally adjacent sections in a recursive manner with at least one feedback loop (21$a$–21$b$–31$a$; 22$a$–22$b$–32$a$; 23$a$–23$b$–33$a$; 24$a$–24$b$–34$a$).

10 Claims, 3 Drawing Sheets

DEVICE FOR RECURSIVE PROCESSING OF A VIDEO SIGNAL, COMPRISING A PLURALITY OF BRANCHES

BACKGROUND OF THE INVENTION

The invention relates to a device for recursive processing of a video signal, comprising a plurality of branches.

The invention is used in devices for processing video signals by means of motion estimation vectors for the decoding and encoding systems in the field of high-definition television (HDTV).

A high-definition video signal processing device is known from the publication "Research Disclosure, September 1991, 643 32903". This publication discloses a system for processing a high-definition television signal having twice the number of lines and twice the number of pixels per line in comparison with a normal definition television signal (NDTV). In accordance with the cited publication, this high-definition television signal may be easily displayed on a multiple display screen constituted by 2×2 normal definition monitors. Thus, each monitor displays a quarter of the high-definition signal, which quarter has the number of lines and the number of pixels per line of a normal definition signal. If necessary, each of these quadrants constituted by a quarter of the original signal may be displayed on a multiple display screen of known type, which results in the initial high-definition signal being displayed by using, for example 4×4 or 6×6 normal-definition monitors.

In accordance with the cited document, the same principle also provides the possibility of recording a high-definition signal by means of 2×2 recording devices each recording only a quarter of the information in the initial high-definition signal.

A high-definition television signal is nowadays to be understood to mean a signal for display on a screen with e.g. 1250 lines and e.g. 1728 pixels per line in accordance with an interlace system.

An interlace system is understood to mean that each frame of e.g. 1250 lines is composed of two fields each comprising half the number of these e.g. 1250 lines. One of these two fields is an EVEN field and comprises all the even lines of the image and the other is the ODD field and comprises all the odd lines of the image. These two fields, or sub-assembly of lines, are superimposable.

The television image is displayed on a screen by means of a temporal scanning method which, at an initial instant, starts at the top and at the left of the screen, and which continues by displaying the first line of the first field towards the right in a time t and by subsequently displaying the line underneath in the same field from the left to the right within a similar time t, and this from top to bottom and from left to right until the whole of the first field has been displayed. An identical temporal scanning from the top to the bottom and from the left to the right subsequently results in the display of all the lines of the second field.

Typically, the present-day television signal display devices display e.g. 25 frames per second, i.e. e.g. 50 fields per second. Devices of this type are referenced by:

1250/50/2:1 where 1250 is the number of lines of the frame, 50 is the number of fields displayed per second and 2:1 represents the number of fields interlaced per frame.

In such a high-definition television system 25 frames, or 50 fields, are displayed in 1 second. This means that a time t=32 µs is necessary for scanning a line and a time T=20 ms is necessary for scanning a field.

Such a high-definition video signal comprises 4 times the number of information components as compared with a normal-definition video signal. Thus, there is a problem when processing these high-definition frames because the clock frequency surpasses the current technological possibilities to a considerable extent. Typically, the clock frequency for high definition is 108 MHz, whereas the majority of components currently known limit the clock frequency to about 30 MHz, typically 27 MHz which corresponds to normal-definition television.

This increase of information in the video signal, as well as this increase of the clock frequency result in problems of processing the digitised signal because the components required for carrying out these processing operations are currently incapable of operating at such frequencies.

The cited document describing the state of the art points out that for solving this problem it is useful to transform the high-speed processing operation to several branches operating at a lower processing speed. To this end the known device demultiplexes the three-dimensional video signal into four adjacent quadrants. Three-dimensional is to be understood to mean the two spatial dimensions defining the display plane and the temporal scanning dimension. The known demultiplexing process is thus realised two-dimensionally in the space, with each field of the high-definition frame being divided into four quadrants of adjacent spatial fields having a normal definition, i.e. each comprising a number of information components corresponding to a complete field of normal definition.

In numerous applications, and particularly in applications for encoding systems as mentioned above, digitised frame sequences are processed and particularly the existence of motion of one sequence with respect to another is detected.

It is an object of the invention to provide a high-definition image processing device which uses the technique of demultiplexing the signal into adjacent sections with a motion estimator.

The combination of the technique of demultiplexing into adjacent sections and motion estimation has the above-mentioned advantages of a speed which is much lower than the operations for processing the digitised signal, and of simpler realisations using normal definition modules. Thus, modules provided for estimating motion in normal definition may also be used for estimating motion in high definition.

A motion estimator is known in the state of the art, with which a recursive method of processing the signal is carried out. This device is described in European Patent Application EP-A-0,415,491. In a preferred use of the motion estimation algorithm which is described in detail in this second state-of-the-art document, and with reference to FIG. 2, a motion vector $\vec{v}(x,y,t)$ estimated at a time t for a current block arranged spatially on coordinates (x,y) of a field depends on two spatial prediction vectors, the left spatial vector being expressed by $\vec{v}(x-1,y-1,t)$ and the other right spatial vector being expressed by $\vec{v}(x+1,y-1,t)$ computed in the same field as the current block, and also depends on two prediction vectors which are both temporal and spatial, the one left temporal vector being expressed by $\vec{v}(x-2,y+2,t-1)$ and the other right temporal vector being expressed by $\vec{v}(x+2,y+2,t-1)$ computed in the preceding field.

This means that in the motion estimation device known from this second cited document each estimated vector depends on estimations preceding the different spatial positions.

Consequently, if a high-definition frame constituted by four adjacent quadrants is to be treated in accordance with the method described in the above-mentioned first document by using the motion estimation algorithm as described in the above-mentioned second document, there will be problems at the adjacent edges of the four quadrants because the motion estimation in each quadrant in the blocks situated at the edge of the quadrants necessitates prior knowledge of the data contained in another quadrant or the other quadrants. The parallel treatment of data of each of the four spatially adjacent quadrants thus turns out to be difficult at the proximity of the adjacent edges of the quadrants.

Generally it appears that a high-definition motion estimation cannot be realised with four normal definition motion estimators of the type mentioned, because these four estimators are arranged in parallel and operate independently.

It is therefore an object of the invention to provide a high-definition video image processing device with means for demultiplexing the video signal into adjacent sections, which may be used for estimating motion while using normal-definition processing means.

SUMMARY OF THE INVENTION

This object is achieved with a device for recursive processing of the video signal, comprising a plurality of n branches for processing, in parallel and in a recursive manner, each section of a plurality of n adjacent sections of a video signal, each branch comprising at least a MEMORY BANK structure which includes:

means for demultiplexing the video signal into a plurality of n temporally adjacent sections T1 . . . Tn having a period which is equal to a single period T;

means for temporal decompression of each temporally adjacent section T1 . . . Tn for obtaining a spread of each decompressed section over a decompression period having a duration of nT;

delay means for delaying each decompressed section by a time which is equal to the single period T and for aligning each delayed decompressed section with the subsequent non-delayed decompressed section; each branch also comprising processing means operating in parallel and being coupled to the outputs of the MEMORY BANK structures, each of these processing means processing one of said temporally adjacent sections in a recursive manner with at least one feedback loop.

The advantage of this device is that the recursive processing of adjacent sections does not present any problems as regards the edges of the spatially adjacent quadrants because the sections are temporally adjacent and each section thus contains all the spatial information.

In a particular embodiment this device is characterized in that, in each branch for processing a temporal section, the processing means include:

a FORMATTING structure for a partitioning each temporal section into adjacent spatial blocks, within a search horizon;

structures for recursive estimation of motion vectors assigned to each spatial block of each temporal section.

The advantage of this device is that in the recursive treatment of adjacent sections the delay means provide all the necessary temporal information by means of the processing operation, because with respect to time all the spatial information of a section is available in the same time. Thus, there are no longer any problems relating to the edges of the adjacent quadrants, which problems would also appear if the spatial information were searched in a temporal manner in a field other than the current field.

A particular embodiment of this device is characterized in that, in each processing branch, the recursive estimation structures include:

a CORRELATION structure for computing the errors between a characteristic function of each pixel of a current block to be estimated and the respective characteristic functions of the corresponding pixels of several prediction blocks;

an ESTIMATION structure for assigning a motion vector to the current block, determined as the vector which corresponds to a prediction block whose characteristic function minimizes or optimizes the error computed by the CORRELATION structure for storing the data relating to the motion vectors computed for the previously estimated blocks of the same temporal section, each ESTIMATION structure having an output for the data relating to said motion vectors.

This device may thus be used for a signal processing device of the recursive motion estimator type.

These and other aspects of the invention will be apparent from and elucidated with reference to the embodiments described hereinafter.

DETAILED DESCRIPTION OF PREFERRED EMBODIMENTS OF THE INVENTION

Figure 1:
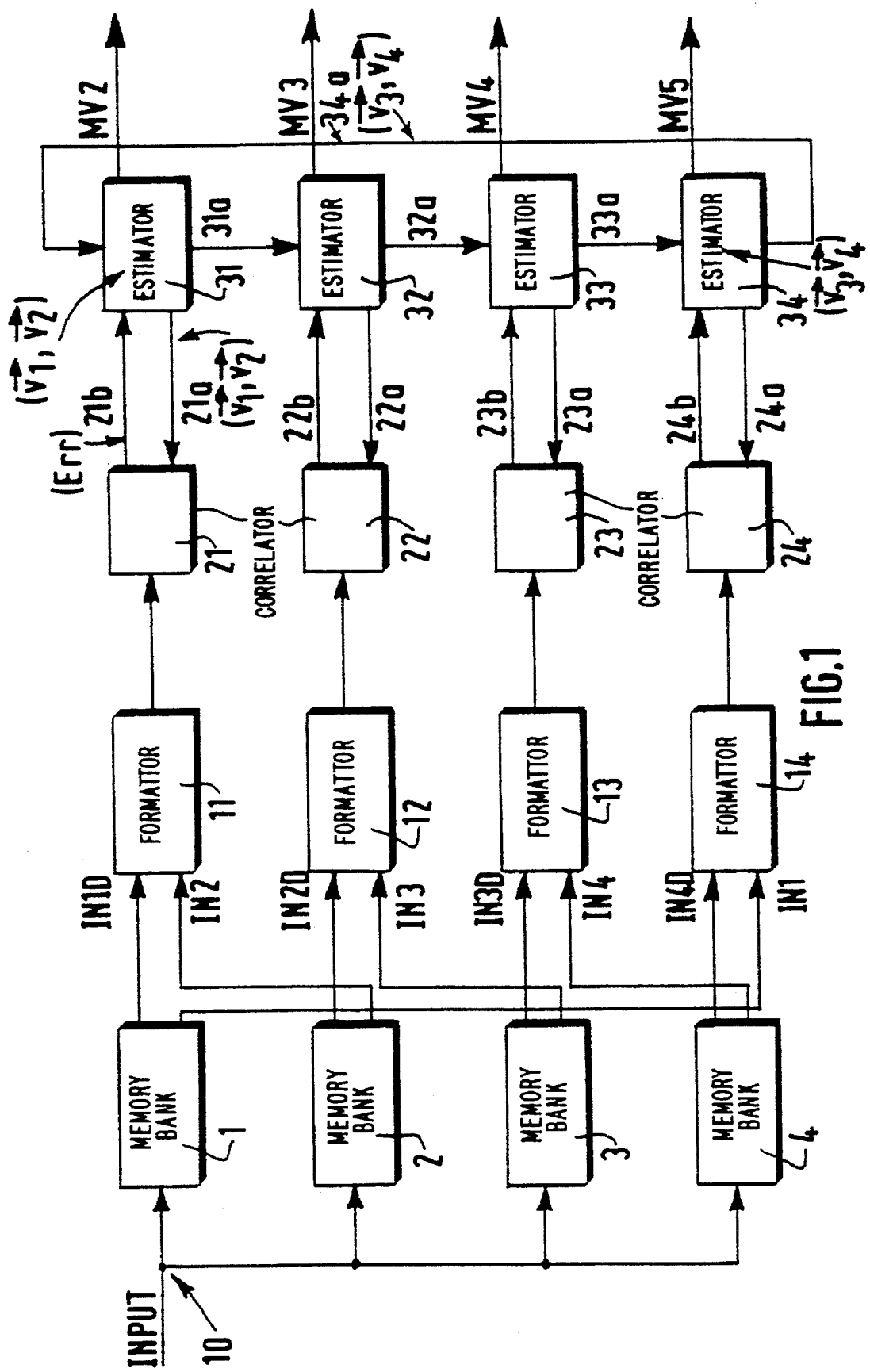
FIG. 1 shows diagrammatically a composition of functional structures for realising a recursive signal processing device used for motion vector estimation.

The present invention takes into account that, with a view to the high rate of dam to be treated in high-definition television it is useful to carry out a parallel treatment of this high-frequency video signal in several branches in which the treatment is carried out at a lower frequency.

In contrast to the device known in the state of the art, the device described hereinafter is based on a temporal demultiplexing operation which provides temporally adjacent sections rather than spatially adjacent sections.

The invention also relates to the use of this demultiplexing technique in temporally adjacent sections with a motion estimator. The use of the temporal demultiplexing technique for motion estimation is not simple. It appears that motion estimation cannot be carried out by means of a plurality of estimators operating in parallel and each being used in a completely independent manner for each of the branches relating to the different temporally adjacent sections.

Generally, the motion estimator system used in the present signal processing device is based on the partition in blocks of each field to be treated. This motion estimator attempts to estimate, at an instant t in a field Tn a motion vector $\vec{v}(x,y,t)$ for a current block marked by its spatial coordinates (x,y). This motion vector depends on several spatial predictions and spatio-temporal predictions. As a result, the computations realised in the estimator require time and necessitate information relating to blocks in the preceding field.

For solving the problems of the clock frequency which should not be too high so as to realise the device by means of structures which are currently on the market, and for solving the problems of the time required for the computations in the motion estimator, the device for recursive processing of the video signal comprises:

means for demultiplexing the video signal into a plurality n of temporally adjacent sections having periods which are equal to a single period T, denoted by T1, T2 ... Tn;

means for temporal decompression of each section by a value which is n times its period for obtaining the spread of each de, compressed section over a decompressed period nT;

delay means for delaying each section by a time which is equal to the single period T and for aligning each delayed decompressed section with the subsequent adjacent non-delayed decompressed section.

In an example of using the method, the temporal sections are consecutive fields of a high-definition frame. The demultiplexing operation provides 4 fields T1, T2, T3, T4 which are treated in 4 parallel-arranged branches for processing the signal. Each signal processing branch thus processes only one field in every four fields, which leaves three field periods. Each field is thus temporally decompressed and spread over 4 periods in each signal processing branch. In the embodiment of a motion estimator used for each field it is also necessary to have spatial information relating to the preceding field. Each decompressed field is thus temporally shifted by a delay which is equal to one field period and is aligned with the next field in which the motion estimation is carried out.

The signal processing device thus comprises a number n of processing branches which is equal to the number of temporally adjacent sections. Each processing branch comprises a FORMATTING structure for spatially partitioning each temporal section into blocks marked by spatial and temporal coordinates, and a search horizon around each block; an ESTIMATION structure which stores the values of the prediction vectors for realising the motion estimation related to the blocks of a given temporal section; a CORRELATION structure for computing the errors in a grey level (or luminance) function between the current block and prediction blocks obtained by means of the prediction vectors; and FEEDBACK means for feeding back the compensated errors relating to all the prediction vectors to the estimation structure so as to estimate the motion vector of the current block as the one which corresponds to the optimized error referred to as optimal error. The optimal error is understood to mean that the estimator can compute either the minimal error relating to all the vectors, or prefers certain vectors to other vectors (for example, those occurring in the same field with respect to those occurring in the preceding field) and computes the resultant error thus optimized.

In a particular application in which the motion estimation takes into account the prediction vectors relating to a temporal section other than that contained in the current block to be estimated, the feedback means comprise coupling means for conveying the information relative to the prediction vectors stored in the estimation structure of a branch other than that of the temporal section concerned and delay means for making the information available at the right moment.

A motion estimator in a high-definition decoding-encoding system has for its object to compute, for example the motion vectors of the even fields which are not transmitted by an encoding system so that the values of these vectors can be transmitted to the decoding system in such a way that the latter is given the means for reconstructing the lacking fields by way of interpolation.

The method described hereinafter and used in the motion estimator is a block matching algorithm (BMA) method. The motion estimator searches a motion vector which is optimized for a given block and in a given field with respect to one or several reference fields. It establishes the correlation between this block and the other blocks of the reference field(s) within a search mirror. The search mirror is defined by the maximum distance within which this block can be reasonably considered in the two spatial directions: the horizontal and vertical direction: The amplitude of the search window thus defined is referred to as search horizon. This amplitude is defined as the number of pixels in the horizontal direction along the lines from left to right and by the number of lines in the vertical direction from top to bottom.

In an example the search horizon may be equal to (−6, +6) pixels and lines in a field Tn having a period of T=20 ms. In another definition standard the search horizon may be more extended.

The motion estimation is based, for example on a three-dimensional recursive block matching method referred to as 3D-RSB (Three-Dimensional Recursive Block Matching) in accordance with which the correlation is established between the given blocks considered in the same field as the current block and in the preceding field.

FIG. 1 shows diagrammatically the functional structures for realising the device for recursive processing of the signal in a non-limitative example.

This device comprises four parallel branches which comprise:

A/MEMORY BANK structures 1, 2, 3, 4. These structures each receive the video signal referred to as INPUT applied to the input 10 at a high resolution and, for example at 108 MHz which is the current standard. These structures have a first function, viz. temporal demultiplexing. The structure 1 of the first branch preserves all the information relating to all the first fields of each group of 4 consecutive fields, i.e. T1 and T5, etc. It eliminates the information relating to T2, T3, T4. The structure 2 of the second branch preserves all the information relating to all the second fields of each group of 4 consecutive fields, i.e. T2, T6, etc. It eliminates the information relating to T1, T3, T4, T5, etc. The same applies by circular permutation in the MEMORY BANK structures 3 and 4.

These MEMORY BANK structures have a second function, viz. temporal decompression of the signal: in the first structure 1 the field T1 of the period T, which is 20 ms in this case, is decompressed for occupying the time left free by the elimination of T2, T3 and T4. After temporal decompression, the period of the field T1 (or its duration) is now distributed across 4T, i.e. 80 ms and lasts until the next field to be treated appears in this first branch, i.e. T5.

Figure 2:
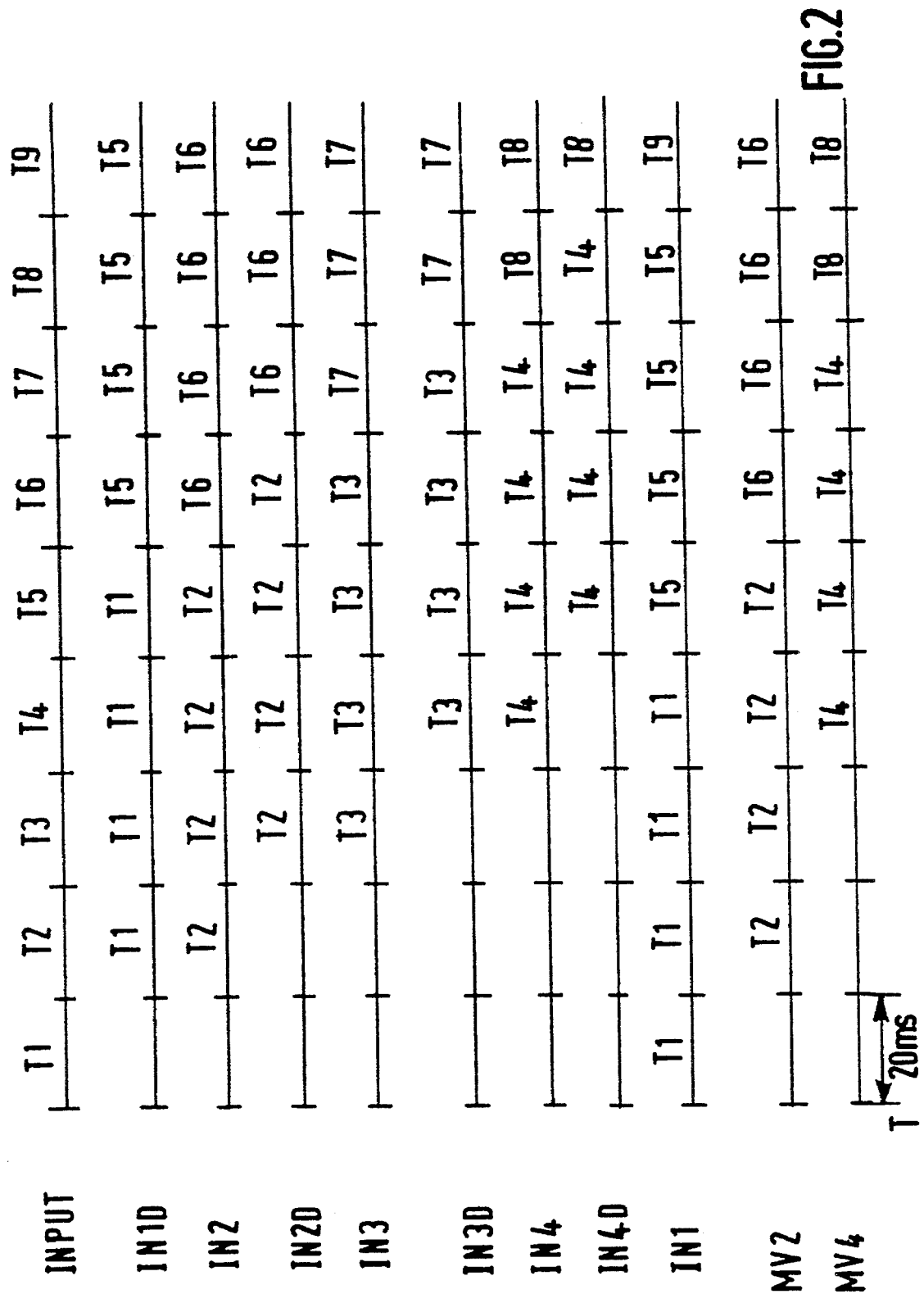
FIG. 2 is a chronogram showing the appearance and duration of the fields in each branch of the device of FIG. 1.

FIG. 2 is a chronogram showing the appearance and duration of the fields in each branch of the device of FIG. 1 and shows that the MEMORY BANK structures have a third function, viz. time shift of the fields processed in these structures. Thus, in the structure 1 the field T1 is shifted by a period T referred to as single period of, for example 20 ms in such a way that this shifted field T1 denoted by DT1 is available at the output IN1D of the first structure 1 at the same instant as the non-shifted field T2 at the output IN2 of the second structure 2. The same applies to the second structure 2 in which the field T2 is shifted by a single period T in such a way that this shifted field DT2 is available at the output IN2D of this second structure 2 at the same instant as the non-shifted field T3 at the output IN3 of the third structure. This is continued for each MEMORY BANK structure, as is evident from the explanation of FIGS. 1 and 2.

With respect to an input INPUT of 108 MHz, the signals have a frequency of 27 MHz at the outputs IN1, IN1D, IN2, IN2D . . . of the MEMORY BANK structures 1, 2, 3, 4.

Each parallel branch of the signal processing device subsequently comprises:

B/FORMATTING structures 11, 12, 13, 14. The first FORMATTING structure 11 in the first branch receives the output IN1D (the delayed output) from the first MEMORY BANK structure and receives the output IN2 (the direct output) from the second MEMORY BANK. The shifted decompressed field DT1 and the decompressed field T2 thus coincide in the first FORMATTING structure 11. Similarly, the shifted decompressed field DT2 and the decompressed field T3 coincide in the second FORMATTING structure 12. By circular permutation and by means of the explanation of FIGS. 1 and 2 the fields processed in the third and fourth FORMATTING structures are obtained. The function of the FORMATTING structures 11, 12, 13, 14 arranged in each of the 4 parallel processing branches is to format the fields so as to prepare them for the correlation operation carded out in the subsequent BMA structure in the branch. Each FORMATTING structure cuts up each field into blocks and applies the block to be estimated to the subsequent BMA structure as well as the search horizon, as defined hereinbefore, in which a current block is estimated.

Each parallel branch of the signal processing device subsequently comprises:

C/BMA (Block Matching Algorithm) structures or CORRELATION structures 21, 22, 23, 24. These BMA structures compute the error Err(BMA) referred to as correlation error for a given displacement vector, for example $\vec{v}1$, $\vec{v}2$, $\vec{v}3$, or $\vec{v}4$ of the block to be estimated with respect to blocks in the preceding field, which blocks are defined by the given displacement.

Figure 3:
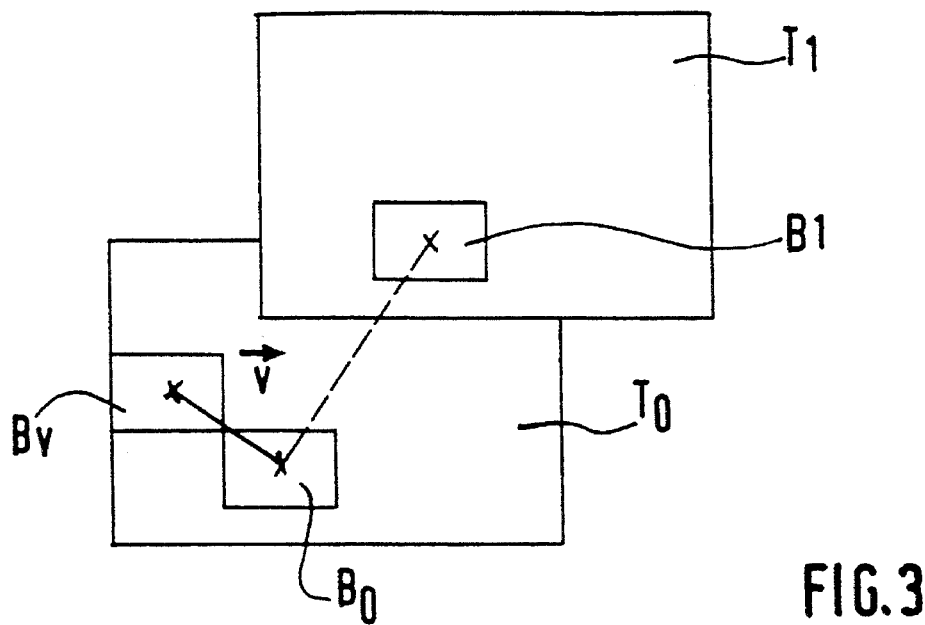
FIG. 3 illustrates the procedure of constructing the prediction blocks by using the prediction vectors.

FIG. 3 illustrates the procedure. As the estimation is effected with respect to the preceding field, the current block B1 in the current field T1 is defined first and subsequently the block Bo is defined in the preceding frame To, which block is a direct projection of the current block B1 and thus has the same spatial coordinates, and subsequently a block Bv obtained by applying a displacement vector $\vec{v}$ to the projection block Bo is defined in the preceding field To. The vector $\vec{v}$ s a prediction vector which will be described hereinafter.

Each pixel of the block B1 to be estimated has coordinates (I,J) marked horizontally from left to right and vertically from top to bottom in the block, and a grey level (or luminance function) X(I,J). Similarly, each pixel of the block Bo obtained by the displacement $\vec{v}$ has a grey level Y(I,J).

Generally, the function of the BMA structure is, for example, to effect the sum of the differences referred to as Err(BMA)=

$$Err(BMA) = \sum_{I,J} |X(I,J) - Y(I,J)|$$

in which the sum of all the differences of intensity between all the pixels of the two blocks B1 and Bv is formed, which differences are established by going through all the respective pixels of these blocks.

When the block Bv is exactly at B1 via the motion vector $\vec{v}$, all the pixels of the two blocks Bv and B1 in the two consecutive fields after the motion $\vec{v}$ are identical. This is expressed by the fact that Err(BMA) is minimal, or optimal.

The BMA CORRELATION structure is thus used for computing the corresponding error Err(BMA) for several vectors provided, viz. $\vec{v}1$, $\vec{v}2$, $\vec{v}3$, $\vec{v}4$, etc.

Figure 4:
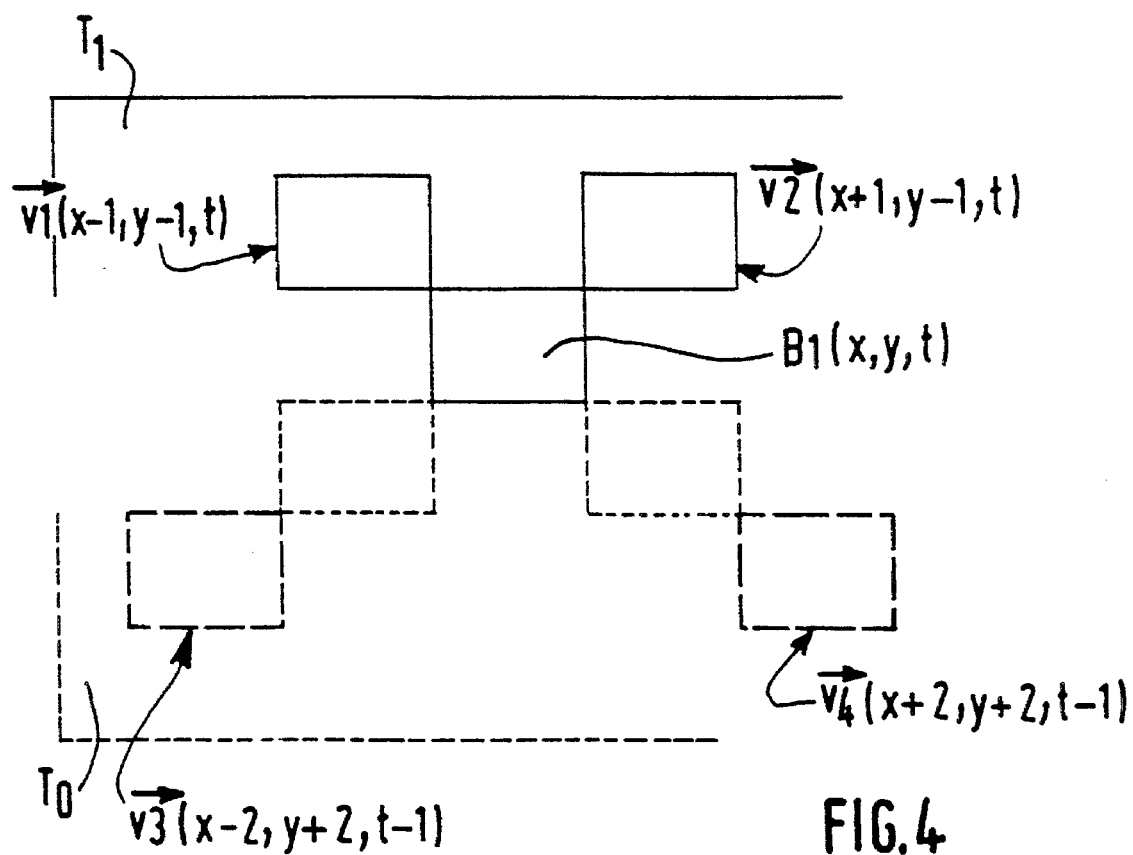
FIG. 4 illustrates a non-exhaustive procedure of choosing the prediction vectors.

These vectors may be provided in different manners. FIG. 4 illustrates a non-exhaustive procedure of choosing prediction vectors which may be used in the BMA structure. The current block or the block to be estimated is represented by B1. It is present in the current field T1 at the spatial coordinates x,y and the temporal coordinate t. The left prediction vectors $\vec{v}1(x-1,y-1,t)$ and the right prediction vectors $\vec{v}2(x+1,y-1,t)$ in the same field may be selected, which vectors are situated at both sides of the current block and above the block, so they are already determined at the instant when it is attempted to realise the estimation of the motion vector of the current block B1. The left prediction vectors $\vec{v}3(x-2,y+2,t-1)$ and the right prediction vectors $\vec{v}4(x+2,y+2,t-1)$ may also be selected, which vectors are situated at both sides of the current block with a spacer block and which are situated in the preceding field To, so they have already been determined at the instant when it is attempted to realise the estimation of the motion vector of the current block B1.

In order to become functional, the BMA structure needs data relating to the current block B1 to be estimated, and prediction vectors as described hereinbefore.

For each prediction vector the BMA structure computes the position of the blocks Bv1, Bv2, Bv3, Bv4 relating to said vectors and then the corresponding error Err(BMA). The BMA structure thus provides as many computation results of Err1, Err2, Err3, Err4 as prediction vectors $\vec{v}1$, $\vec{v}2$, $\vec{v}3$, $\vec{v}4$, etc. are provided.

There are several other methods of choosing prediction vectors. These methods will not be described but may be used without any problem for providing the BMA structure with the corresponding prediction vectors.

Each parallel branch of the signal processing device subsequently comprises ESTIMATION structures 31, 32, 33, 34. In the first branch the ESTIMATION structure 31 stores the information relating to prediction vectors such as $\vec{v}1$ and $\vec{v}2$ which are computed in the same field and thus in the same branch, but at a preceding instant. In contrast, the ESTIMATION structure 31 cannot contain the information relating to the preceding field. This information is to be found in the ESTIMATION structure 34. It is fed to the structure 31 via a loop 34a.

At the instant when it is attempted to estimate the current block B1, the ESTIMATION structure 31 already comprises information relating to the prediction vectors $\vec{v}1$, $\vec{v}2$, ... The ESTIMATION structure 31 thus transmits the information relating to the first prediction vector $\vec{v}1$ to the BMA structure 21 via the path 21a. The BMA structure 21 then computes the corresponding error Err1 and transmits it to the ESTIMATION structure via the path 21b. Subsequently, the ESTIMATION structure 31 transmits the data relating to the prediction vector $\vec{v}2$ to the BMA structure 21 via the path 21a and the BMA structure transmits the corresponding error Err2 to the ESTIMATION structure 31 via the path 21b, etc.

Similar operations are carried out also in a recursive manner between the structures 22 and 32 via the paths 22a, 22b, between the structures 23 and 33 via the paths 23a, 23b and between the structures 24 and 34 via the paths 24a, 24b.

Between the different ESTIMATION structures 31, 32, 33, 34 the paths 31a, 32a, 33a, 34a ensure the circulation of the data relating to the prediction vectors which have already been computed. These different paths, which ensure the recursivity of the CORRELATION and ESTIMATION procedures, are thus indispensable.

Whenever an ESTIMATION structure has received, all the error computations from the corresponding BMA structure, which computation correspond to all the prediction vectors relating to the current block B1 to be estimated, this ESTIMATION structure selects, among the prediction vectors, that vector which corresponds to the optimal error and assigns this vector to said current block as the estimated motion vector.

Subsequently, the procedure is continued for the next block chosen by way of scanning the treated field from left to right and from top to bottom until the field relating to the branch is treated completely.

During the same time the other branches of the device carry out a similar operation on the fields which have been attributed to them.

The ESTIMATION structures of the four branches of the device of FIG. 1 each provide the motion vectors of the fields T2, T3, T4, T5 at the outputs MV2, MV3, MV4, MV5, respectively.

These outputs MV2, MV3, MV4, MV5 are fed back to the input of a decoder which reconstructs a high-definition image from these data. The principle is to transmit the vectors of the fields to the decoder, which fields have been suppressed during encoding and which have therefore not been transmitted to the decoder.

The device for recursive processing of the signal is thus free from bad effects of reconstructing a high-definition image from four spatially adjacent quadrants.

Moreover, the device has a very simple structure as regards the rate of processed information.

As stated above, the present device provides the advantageous possibility of realising a temporal demultiplexing operation in four fields for an initial signal at 108 MHz with regard to the current technological limitations of components. However, with the technological progress of components, the possibility of realising a device for recursive processing of an image with two parallel branches only is not to be excluded in future developments.

I claim:

1. A device for recursive processing of a video signal, comprising a plurality of n branches for processing, in parallel and in a recursive manner, each section of a plurality of n adjacent sections of a video signal, wherein n is an integer equal to 2 or greater, each branch comprising at least a MEMORY BANK structure (1, 2, 3, 4) which includes:

a) means for demultiplexing the video signal into a plurality of n temporally adjacent sections T1 . . . Tn having a period which is equal to a single period T;

b) means for temporal decompression of each temporally adjacent section T1 . . . Tn for obtaining a spread of each decompressed section over a decompressed period having a duration of nT;

c) delay means for delaying each decompressed section by a time which is equal to the single period T and for aligning each delayed decompressed section with the subsequent non-delayed decompressed section;

each branch also comprising processing means (11–21–31; 12–22–32; 13–23–33; 14–24–34) operating in parallel and being each coupled to the output of their respective MEMORY BANK structure, each processing means processing one of said temporally adjacent sections in a recursive manner with at least one feedback loop (21a–21b–31a; 22a–22b–32a; 23a–23b–33a; 24a–24b–34a).

2. A device as claimed in claim 1, wherein in each branch for processing a temporal section, the processing means include:

a FORMATTING structure (21, 22, 23, 34) for partitioning each temporal section into adjacent spatial blocks, within a search horizon;

structures for recursive estimation of motion vectors assigned to each spatial block, of each temporal section.

3. A device as claimed in claim 2, wherein in each processing branch, the recursive ESTIMATION structures include:

a CORRELATION structure (31, 32, 33, 34) for computing the errors between a characteristic function of each pixel of a current block to be estimated and the respective characteristic functions of the corresponding pixels of several prediction blocks;

an ESTIMATION structure (41, 42, 43, 44) for assigning a motion vector to the current block, determined as the vector which corresponds to a prediction block whose characteristic function minimizes or optimizes the error computed by the CORRELATION structure for storing the data relating to the motion vectors computed for previously estimated the blocks of the same temporal section, each ESTIMATION structure having an output for the data relating to said motion vectors.

4. A device as claimed in claim 3, wherein in each processing branch, the CORRELATION structure comprises means for constructing prediction blocks from data relating to motion vectors corresponding to blocks already estimated in the same temporal section and corresponding to blocks already estimated in the adjacent temporal section preceding that of the current block, and means for determining said characteristic functions of the pixels of said prediction blocks.

5. A device as claimed in claim 4, wherein the feedback loops comprise coupling means (31a, 32a 33a, 34a) for transmitting the data relating to the motion vectors previously estimated in the blocks of the preceding adjacent temporal section to the ESTIMATION structure of a processing branch of a temporal section.

6. A device as claimed in claim 5, wherein in each processing branch, the feedback loops comprise coupling means (21a, 22a, 23a, 24a) for applying data relating to previously estimated motion vectors of blocks of the same temporal section and blocks of the preceding adjacent temporal section to the CORRELATION structure of the branch concerned, which data are stored in the ESTIMATION structure of the branch, and reverse coupling means (21b, 22b, 23b, 24b) for applying the errors computed by the CORRELATION structure between the characteristic functions of a current block and the corresponding characteristic functions of the prediction blocks corresponding to this current block to the ESTIMATION structure of the branch concerned.

7. A device as claimed in claim 6, wherein the feedback coupling means comprise delay means for transmitting the information required for the construction of the prediction blocks at the time required by the CORRELATION structure.

8. A device as claimed in claim 1, wherein temporally adjacent sections are fields of television frames.

9. A device as claimed in claim 8, wherein the number n is 4, i.e. each branch processes one out of four fields of the video signal, and each field is temporally decompressed over a period which is equal to 4 times its initial period or single period.

10. A device as claimed in claim 8, wherein the number n is 2, i.e. each branch processes one out of two fields of the video signal, and each field is temporally decompressed over a period which is equal to twice its initial period or single period.

* * * * *